United States Patent
Cho et al.

(10) Patent No.: US 11,183,333 B2
(45) Date of Patent: Nov. 23, 2021

(54) MULTILAYERED ELECTRONIC COMPONENT

(71) Applicant: SAMSUNG ELECTRO-MECHANICS CO., LTD., Suwon-si (KR)

(72) Inventors: Won Woo Cho, Suwon-si (KR); Jong Duck Kim, Suwon-si (KR); Jae Sun Won, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 32 days.

(21) Appl. No.: 16/864,653

(22) Filed: May 1, 2020

(65) Prior Publication Data

US 2021/0202176 A1    Jul. 1, 2021

(30) Foreign Application Priority Data

Dec. 31, 2019  (KR) .......................... 10-2019-0179349

(51) Int. Cl.
| | |
|---|---|
| *H01G 4/30* | (2006.01) |
| *H01G 4/012* | (2006.01) |
| *H01G 2/06* | (2006.01) |
| *H01G 4/12* | (2006.01) |
| *H01G 4/40* | (2006.01) |

(52) U.S. Cl.
CPC .............. *H01G 4/30* (2013.01); *H01G 2/065* (2013.01); *H01G 4/012* (2013.01); *H01G 4/1218* (2013.01); *H01G 4/40* (2013.01)

(58) Field of Classification Search
CPC .......... H01G 4/12; H01G 4/1209; H01G 2/06; H01G 2/065; H01G 4/005; H01G 4/012; H01G 4/232; H01G 4/30; H01G 4/38; H01G 4/248; H01G 4/1218; H01G 4/40; H05K 1/182
See application file for complete search history.

(56) References Cited

U.S. PATENT DOCUMENTS 10,008,310 B1 *  6/2018  Ryu .......................... H01C 1/02
10,104,776 B2 * 10/2018  Yun ........................ H05K 1/181
(Continued)

FOREIGN PATENT DOCUMENTS

| | | |
|---|---|---|
| JP | H07-38359 B2 | 4/1995 |
| JP | H10-303066 A | 11/1998 |

*Primary Examiner* — Michael P McFadden
(74) *Attorney, Agent, or Firm* — Morgan, Lewis & Bockius LLP

(57) ABSTRACT

A multilayer electronic component includes a body including dielectric layers, and first and second internal electrodes alternately stacked in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction, a resistor disposed on the second surface, a via electrode exposed to the second surface and connecting the second internal electrode and the resistor to each other, a first external electrode disposed on the third surface and connected to the first internal electrode, and a second external electrode disposed on the fourth surface and connected to the resistor.

14 Claims, 6 Drawing Sheets

(56) References Cited

U.S. PATENT DOCUMENTS

| | | | |
|---|---|---|---|
| 2011/0043963 A1* | 2/2011 | Bultitude | H01G 4/40 361/321.4 |
| 2014/0133065 A1* | 5/2014 | Armstrong | H01G 4/385 361/321.2 |
| 2015/0124371 A1* | 5/2015 | Park | H01G 4/30 361/301.4 |
| 2018/0019064 A1* | 1/2018 | Han | H01G 2/06 |

* cited by examiner

MULTILAYERED ELECTRONIC COMPONENT

CROSS-REFERENCE TO RELATED APPLICATION(S)

The present application claims the benefit of priority to Korean Patent Application No. 10-2019-0179349 filed on Dec. 31, 2019 in the Korean Intellectual Property Office, the entire disclosure of which is incorporated herein by reference.

BACKGROUND

1. Field

The present disclosure relates to a multilayer electronic component.

2. Description of Related Art

Provided are various types of capacitor, such as an electrolytic capacitor in which an aluminum oxide is contained as a dielectric material, a film capacitor in which a film dielectric material such as aluminum or copper is rolled into an electrode, a multilayer ceramic capacitor (MLCC) in which dielectric layers, each including a material having a high dielectric constant such as barium titanate, and internal electrode are stacked, and the like.

A multilayer ceramic capacitor (MLCC), a type of multilayer electronic component, may be a chip type capacitor mounted on the printed circuit boards of various electronic products such as imaging devices including liquid crystal displays (LCDs), plasma display panels (PDPs), and the like, and computers, smartphones, mobile phones, and the like, serving to charge or discharge electricity therein or therefrom. In addition, an MLCC has roles such as the stabilization of a power supply voltage, voltage decoupling, attenuation of radio-frequency noise, a DC block, and the like, in an electronic control unit (ECU) of a vehicle.

As the number of automotive electronic components has increased due to the recent introduction of autonomous driving of vehicles and eco-friendly vehicles, the number of MLCCs used in vehicles is increasing. A use environment of automotive electronic components is more severe than a use environment of common electronic components and automotive electronic components are required to have higher reliability.

An MLCC has an advantage of securing high capacitance with respect to volume by stacking thin dielectric layers and internal electrodes, but the external impact may have a great effect on an internal structure because the internal space is significantly used to secure high capacitance. When cracking occurs in an MLCC due to an external impact or the like, internal electrodes, which should have opposite polarities, may be short-circuited to cut off power supply to a load and to generate an overcurrent. Therefore, in an application required to have high capacitance, an MLCC is not used alone and is used together with an aluminum capacitor or a film capacitor.

In addition, since most MLCCs are arranged in parallel in a circuit, the circuit may no longer operate, even when only one of the MLCC arranged in parallel fails.

SUMMARY

An aspect of the present disclosure is to provide a multilayer electronic component including a resistor, capable of serving as a fuse, such that when a short-circuit occurs between internal electrodes, a short-circuited portion is opened by overcurrent.

Another aspect of the present disclosure is to provide a multilayer electronic component having a shape allowing a resistance value of a resistor to be easily adjusted.

However, the objects of the present disclosure are not limited to the above description, and will be more easily understood in the process of describing specific exemplary embodiments of the present disclosure.

According to an aspect of the present disclosure, a multilayer electronic component includes a body including dielectric layers, and first and second internal electrode alternately stacked with respective dielectric layers interposed therebetween in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction, a resistor disposed on the second surface, a via electrode exposed to the second surface and connecting the second internal electrode and the resistor to each other, a first external electrode disposed on the third surface and connected to the first internal electrode, and a second external electrode disposed on the fourth surface and connected to the resistor.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
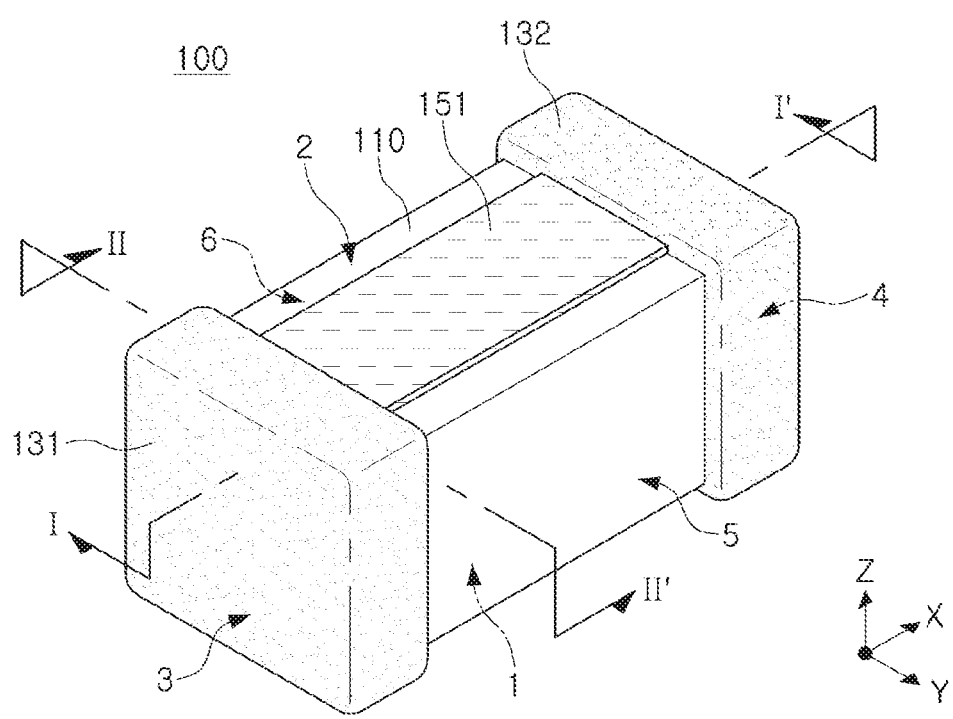
FIG. 1 is a schematic perspective view of a multilayer electronic component according to an exemplary embodiment of the present disclosure.

Hereinafter, exemplary embodiments of the present disclosure will be described as follows with reference to the attached drawings.

Hereinafter, exemplary embodiments of the present disclosure will be described with reference to specific exemplary embodiments and the accompanying drawings. However, exemplary embodiments of the present disclosure may be modified to have various other forms, and the scope of the present disclosure is not limited to the exemplary embodiments described below. Further, exemplary embodiments of the present disclosure may be provided for a more complete description of the present disclosure to the ordinarily skilled artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, an X direction may be defined as a second direction, an L direction, or a longitudinal direction, a Y direction may be defined as a third direction, a W direction, or a width direction, and a Z direction may be defined as a first direction, a stacking direction, a T direction, or a thickness direction.

Multilayer Electronic Component

FIG. 1 is a schematic perspective view of a multilayer electronic component according to an exemplary embodiment of the present disclosure.

Figure 2:
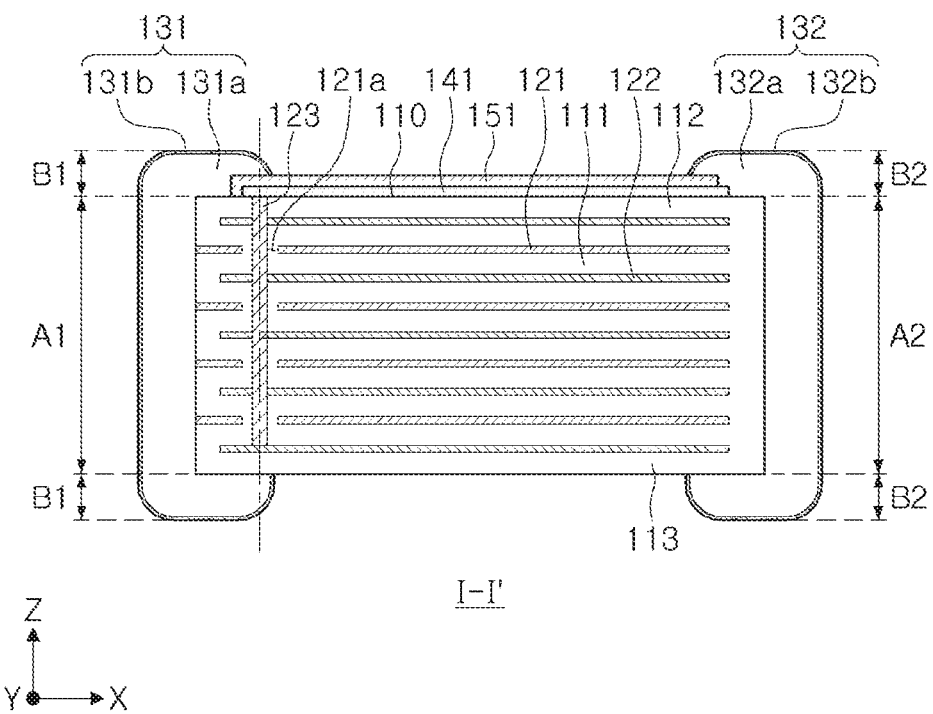
FIG. 2 is a cross-sectional view taken along line I-I' in FIG. 1.

FIG. 2 is a cross-sectional view taken along line I-I' in FIG. 1.

Figure 3:
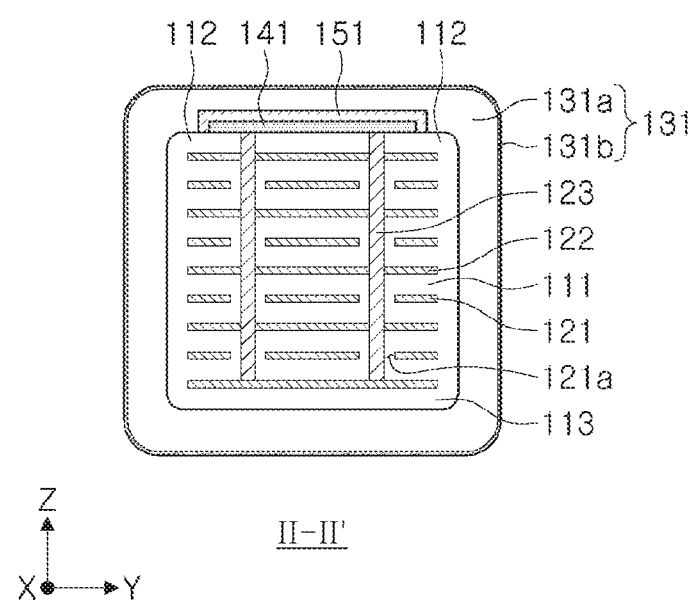
FIG. 3 is a cross-sectional view taken along line II-II' in FIG. 1.

FIG. 3 is a cross-sectional view taken along line II-II' in FIG. 1.

Figure 4:
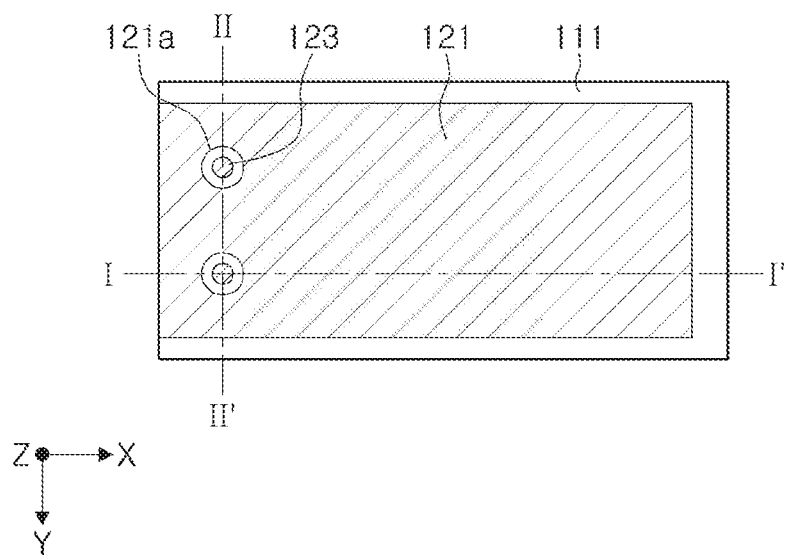
FIG. 4 is a plan view of a first internal electrode according to an exemplary embodiment of the present disclosure.

FIG. 4 is a plan view of a first internal electrode according to an exemplary embodiment of the present disclosure.

Figure 5:
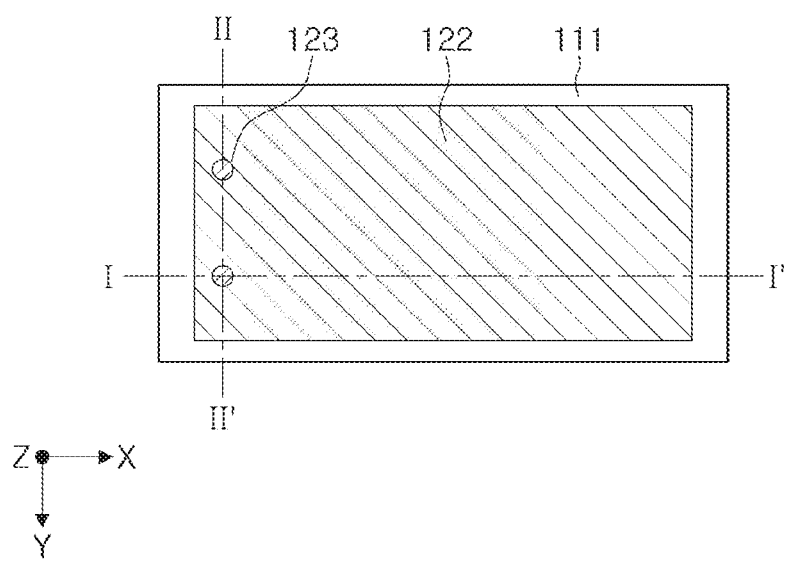
FIG. 5 is a plan view of a second internal electrode according to an exemplary embodiment of the present disclosure.

FIG. 5 is a plan view of a second internal electrode according to an exemplary embodiment of the present disclosure.

Hereinafter, a multilayer electronic component 100 according to an exemplary embodiment will be described with reference to FIGS. 1 to 5.

A multilayer electronic component 100 according to an exemplary embodiment may include a body 110 including dielectric layers 111, and first and second internal electrode 121 and 122 alternately stacked with respective dielectric layers interposed therebetween in a first direction (a Z direction), and having first and second surfaces 1 and 2 opposing each other in the first direction, third and fourth surfaces 3 and 4 connected to the first and second surfaces 1 and 2 and opposing each other in a second direction (an X direction), and fifth and sixth surfaces 5 and 6 connected to the first to fourth surfaces 1, 2, 3, and 4 and opposing each other in a third direction (a Y direction), a resistor 141 disposed on the second surface 2, a via electrode 123 exposed to the second surface 2 and connecting the second internal electrode 122 and the resistor 141 to each other, a first external electrode 131 disposed on the third surface 3 and connected to the first internal electrode 121, and a second external electrode 132 disposed on the fourth surface 4 and connected to the resistor 141.

In the body 110, the dielectric layers 111 and the internal electrodes 121 and 122 are alternately stacked.

The body 110 is not limited in shape, but may have a hexahedral shape or a shape similar thereto. Due to shrinkage of ceramic powder particles included in the body 110 during sintering, the body 110 may have a substantially hexahedral shape rather than a hexahedral shape having complete straight lines.

The body 110 may have the first and second surfaces 1 and 2 opposing each other in a thickness direction (a Z direction), the third and fourth surfaces 3 and 4 connected to the first and second surfaces 1 and 2 and opposing each other in a length direction (an X direction), and the fifth and sixth surfaces 5 and 6 connected to the first and second surfaces 1 and 2 and as well as to the third and fourth surfaces 3 and 4 and opposing each other in a width direction (an Y direction).

The plurality of dielectric layers 111, constituting the body 110, is in a sintered state and may be integrated with each other such that boundaries therebetween may not be readily apparent without using a scanning electron microscope (SEM).

According to an exemplary embodiment, a raw material forming the dielectric layer 111 is not limited as long as sufficient capacitance may be obtained. For example, the raw material forming the dielectric layer 111a may a barium titanate-based material, a lead composite perovskite-based material, a strontium titanate-based material, or the like. The barium titanate-based material may include $BaTiO_3$-based ceramic powder particles. The $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, prepared by partially employing calcium (Ca), zirconium (Zr), and the like, in $BaTiO_3$.

Various ceramic additives, organic solvents, plasticizers, binders, dispersants, or the like, may be added to the powder particles of barium titanate ($BaTiO_3$), or the like, according to the purpose of the present disclosure, as the material for forming the dielectric layer 111. The ceramic additive may include transition metal oxides or carbides, rare earth elements, magnesium (Mg), aluminum (Al), or the like The body 110 may have a capacitance forming portion disposed in the body 110 and including the first and second internal electrode layers 121 and 122, disposed to oppose each other with the dielectric layer 111 interposed therebetween, to form capacitance, and upper and lower protective layers 112 and 113 disposed above and below the capacitance forming portion.

The capacitance forming portion may contribute to capacitance formation of a capacitor, and may be formed by repeatedly stacking the plurality of first and second internal electrode layers 121 and 122 with the dielectric layer 111 interposed therebetween.

The upper protective layer 112 and the lower protective layer 113 may be formed by stacking a single dielectric layer or two or more dielectric layers on upper and lower surfaces of the capacitance forming portion, respectively, in the vertical direction, and may basically play a role in preventing damage to the internal electrodes due to physical or chemical stress.

The upper protective layer 112 and the lower protective layer 113 may not include an internal electrode, and may include the same material as the dielectric layer 111.

The internal electrodes 121 and 122 may be disposed to oppose each other with the dielectric layer 111 interposed therebetween. The internal electrodes 121 and 122 may include first and second internal electrodes 121 and 122 alternately disposed to oppose each other with respective dielectric layers interposed therebetween.

The first internal electrode 121 is exposed to the third surface 3 to be connected to the first external electrode 131, and the second internal electrode 122 is connected to the second external electrode 132 through the via electrode 123 and the resistor 141. Thus, the first internal electrode 121 and the second internal electrode 122 may have opposite polarities.

The first internal electrode 121 may be spaced apart from the fourth surface 4 and exposed to the third surface 3. In addition, the first internal electrode 121 may be spaced apart from the fifth and sixth surfaces 5 and 6. The second internal electrode 122 may be spaced apart from the third and fourth surfaces 3 and 4. In addition, the second internal electrode 122 may be spaced apart from the fifth and sixth surfaces 5 and 6. For example, the second internal electrode 122 may be formed so as not to be exposed outwardly of the body 110.

The first and second internal electrodes 121 and 122 may be electrically separated from each other by the dielectric layer 111 disposed therebetween.

The body 110 may be formed by alternately stacking a dielectric layer 111, on which the first internal electrode 121 is printed, and a dielectric layer, on which the second internal electrode 122 is printed, in the thickness direction (the Z direction) and sintering the stacked dielectric layers 111.

A material of the internal electrodes 121 and 122 is not necessarily limited, and may be a material having improved electrical conductivity. For example, the internal electrodes 121 and 122 may be formed by printing an internal electrode conductive paste, including at least one of nickel (Ni), copper (Cu), palladium (Pd), silver (Ag), gold (Au), platinum (Pt), tin (Sn), and tungsten (W), titanium (Ti), and alloys thereof, on a ceramic green sheet.

A method of printing the internal electrode conductive paste may be a screen-printing method or a gravure printing method, but is not limited thereto.

The via electrode 123 is exposed to the second surface 2, and serves to electrically connect the second internal electrode 122 and the resistor 141.

The via electrode 123 is not electrically connected to the first internal electrode 121. To this end, the first internal electrode 121 may include an opening 121a by which the first internal electrode 121 can be spaced apart from the via electrode 123, and the via electrode 123 may be disposed to penetrate through the opening 121a and the second internal electrode 122. In this case, the penetration direction of the via electrode 123 may be the first direction.

The via electrode 123 may be formed by forming a via in the body 110 and filling the via with a conductive material. The conductive material may be at least one of nickel (Ni), copper (Cu), palladium (Pd), silver (Ag), gold (Au), platinum (Pt), tin (Sn), tungsten (W), titanium (Ti), alloys thereof.

A physical penetration method using a mechanical pin puncher, or the like, or a laser drilling method may be used to form a via. However, when a thickness of the body 110 is excessively small, use of the laser drilling method may cause damage to peripheries of the via, and thus, connectivity of the electrode may be deteriorated. Therefore, in detail, the physical penetration method may be used.

In an exemplary embodiment, two via electrodes 123 are provided. However, only one via electrode 123 may be provided or two or more via electrode 123 may be provided. When a plurality of via electrodes 123 are provided, they are disposed side by side in the third direction (the Y direction).

The resistor 141 is disposed on the second surface 2 and serves to electrically connect the via electrode 123 and the second external electrode 132.

In addition, the resistor 141 may serve as a fuse.

The first internal electrode 121 and the second internal electrode 122 may be short-circuited due to an internal defect of an MLCC, an external impact, an external surge, or the like. When an MLCC is short-circuited, functions of the MLCC may not run, and a power line may have a voltage of 0V to prevent the entire circuit, including the MLCC, from operating. Additionally, since most MLCCs are disposed in parallel in a circuit, the circuit does not operate any more even when only one of the MLCCs fails.

When a short-circuit occurs between the internal electrodes 121 and 122 due to an external physical impact or the like, the resistor 141 may be broken due to overcurrent generated by the short-circuit. Thus, the second external electrode 132 and the internal electrodes 121 and 122 may be electrically opened to prevent damage to the entire circuit connected to a multilayer electronic component.

A resistance value of the resistor 141 is not necessarily limited, and the resistor 141 may have a resistance value such that the resistor 141 may be heated to be cut off when overcurrent of a predetermined level or higher is generated. For example, the resistor 141 may have a resistance value of 10 mΩ or less.

According to the present disclosure, when the resistor 141 is connected to the second internal electrode 122 through the via electrode 123 and the resistor 141 is disposed on the second surface 2 of the body 110, the resistor 141 may be provided in the form of a thin film, and a width and a length of the thin film may be controlled to adjust the resistance value, so that current and power capacity required in the circuit may be easily adjusted in a wide range.

In this case, one end portion of the resistor 141 in the second direction (the X direction) may be connected to the second external electrode 132, and the other end portion of the resistor 141 in the second direction may be connected to the via electrode 123. Accordingly, a length of the resistor 141 may be significantly secured to easily adjust the resistance value.

A cover portion 151 may be disposed on the resistor 141, and the cover 151 may be disposed to cover a portion of the resistor 141 except for one end portion of the resistor connected to the second external electrode 132 in the second direction (the X direction). Thus, the resistor 141 may be protected from an external physical impact or the like, and corrosion caused by external contact of the resistor 141 may be prevented.

A material of the cover portion 151 is not necessarily limited, and may be a material resistant to an external impact, an insulating material, or the like. In addition, the cover portion 151 may include a dielectric material. Accordingly, bonding force between the cover part 151 and the body 110 may be further improved and insulation properties may be ensured.

When a length of the resistor 141 is increased, the resistor 141 may be connected to the first external electrode 131. Therefore, the cover portion 151 may serve to prevent the first external electrode 121 and the resistor 141 from being connected and short-circuited to each other. In this case, the second external electrode 132 may extend to cover one end portion of the cover portion 151 in the second direction, and the first external electrode 131 may extend to cover the other end portion of the cover portion 151 in the second direction.

A material of the resistor 141 is not necessarily limited and may be a material, heated to be cut off when overcurrent of a predetermined level or higher is generated, while having conductivity. For example, the resistor 141 may be a metal glaze. The metal glaze may be obtained by mixing a metal or a metal oxide mixed with glass, printing the mixture on a surface of the body 110, and sintering the printed mixture at high temperature. The metal or a metal in the metal oxide may be at least one of nickel (Ni), copper (Cu), palladium (Pd), silver (Ag), gold (Au), platinum (Pt), tin (Sn), tungsten (W), titanium (Ti), and alloys thereof. Since the resistor 141 is the metal glaze, the bonding force to the body 110 may be improved, and the resistor 141 may be prevented from being broken due to an external impact or the like, rather than overcurrent.

The external electrodes 131 and 132 are disposed on the body 110 and are electrically connected to the internal electrodes 121 and 122.

As illustrated in FIG. 2, the first external electrode 131 may be connected to the first internal electrode disposed on the third surface 3 to be exposed to the third surface 3, and the second external electrode 132 may be electrically connected to the second internal electrode 122 through the resistor 141 and the via electrode 123.

A region of the first external electrode 131 may be divided depending on a location thereof. The first external electrode 131 may have a first connection portion A1, disposed on the third surface 3 of the body 110, and a band portion B1 extending from the first connection portion A1 to a portion of the first and second portions 1 and 2.

A region of the second external electrode 132 may be divided depending on a location thereof. The second external electrode 132 may have a first connection portion A2, disposed on the fourth surface 4 of the body 110, and a band portion B2 extending from the first connection portion A2 to a portion of the first and second portions 1 and 2.

The external electrodes 131 and 132 may be formed of any material, as long as it has electrical conductivity, such as a metal. A detailed material of the external electrodes 131 and 132 may be selected in consideration of electrical characteristics, structural stability, and the like. Further, the external electrodes 131 and 132 may have a multilayer structure.

For example, the external electrodes 131 and 132 may include electrode layers 131a and 132a, disposed on the body 110, and plating layers 131b and 132b disposed on the electrode layers 131a and 132a.

A detailed example of each of the electrode layers 131a and 132a may be a sintered electrode, including a conductive metal or glass, or a resin-based electrode including a conductive metal or a resin.

In addition, each of the electrode layers 131a and 132a may have a shape in which a sintered electrode and a resin-based electrode are sequentially formed on the body 110. In addition, each of the electrode layers 131a and 132a may be formed by transferring a sheet including a conductive metal to the body 110, or may be formed by transferring a sheet including a conductive metal to a sintered electrode. In addition, each of the first and second electrode layers 131a and 132a may be formed by means of atomic layer deposition (ALD), molecular layer deposition (MLD), chemical vapor deposition (CVD), sputtering, or the like.

A conductive metal used for the electrode layers 131a and 132a is not necessarily limited as long as it may be electrically connected to the internal electrode to form capacitance. The conductive material may be, for example, at least one selected from the group consisting of nickel (Ni), copper (Cu), palladium (Pd), silver (Ag), gold (Au), platinum (Pt), tin (Sn), tungsten (W), titanium (Ti), and alloys thereof.

A detailed example of each of the plating layers 131b and 132b may be a nickel (Ni) plating layer or a tin (Sn) plating layer, or may have a structure in which a Ni plating layers and a Sn plating layers are sequentially formed on the electrode layers 131a and 132a, or may have a structure in which a Sn plating layer, a Ni plating layer, and a Sn plating layer are sequentially formed on the electrode layers 131a and 132a. In addition, each of the plating layers 131b and 132b may include a plurality of Ni plating layers and/or a plurality of Sn plating layers.

Figure 6:
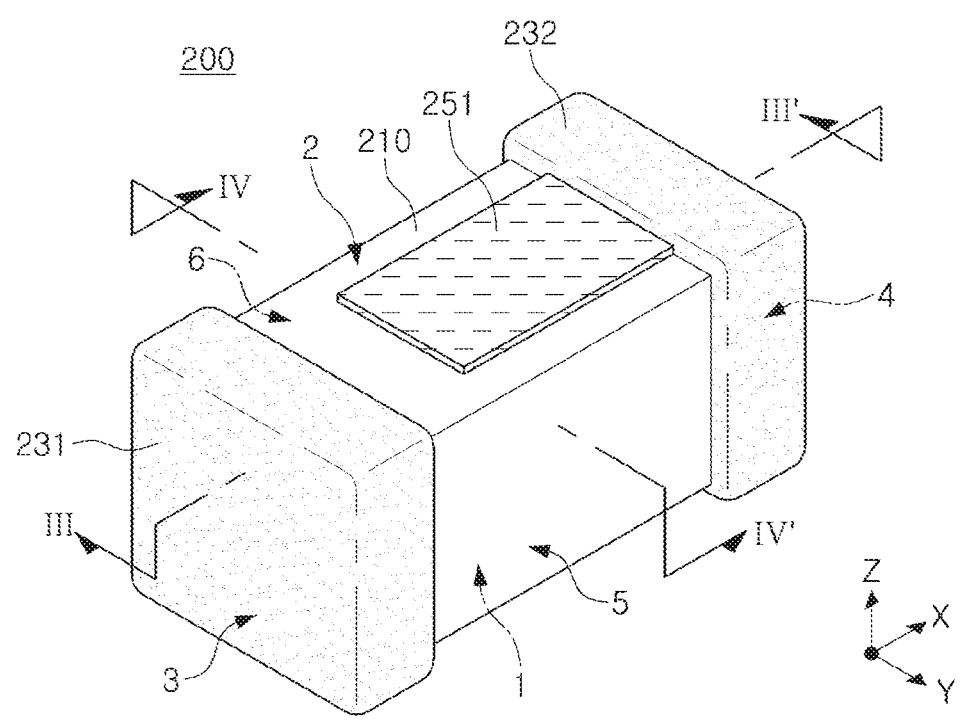
FIG. 6 is a schematic perspective view of a multilayer electronic component according to another exemplary embodiment of the present disclosure.

FIG. 6 is a schematic perspective view of a multilayer electronic component according to another exemplary embodiment of the present disclosure.

Figure 7:
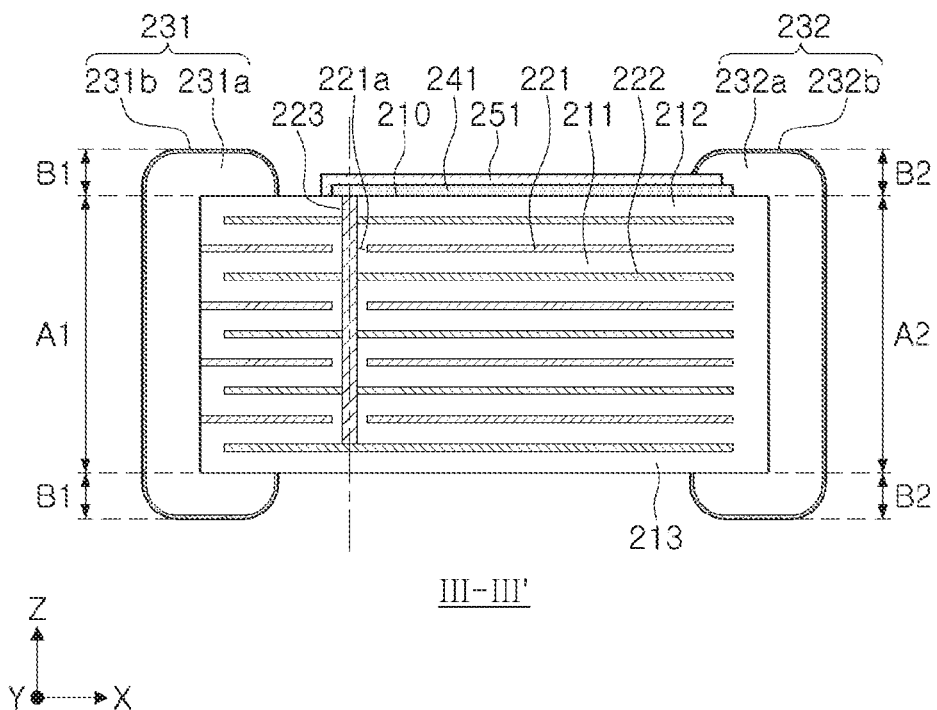
FIG. 7 is a cross-sectional view taken along line III-III' in FIG. 6.

FIG. 7 is a cross-sectional view taken along line III-III' in FIG. 6.

Figure 8:
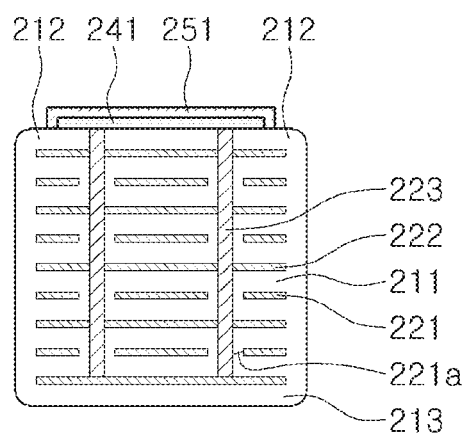
FIG. 8 is a cross-sectional view taken along line IV-IV' in FIG. 6.

FIG. 8 is a cross-sectional view taken along line IV-IV' in FIG. 6.

Figure 9:
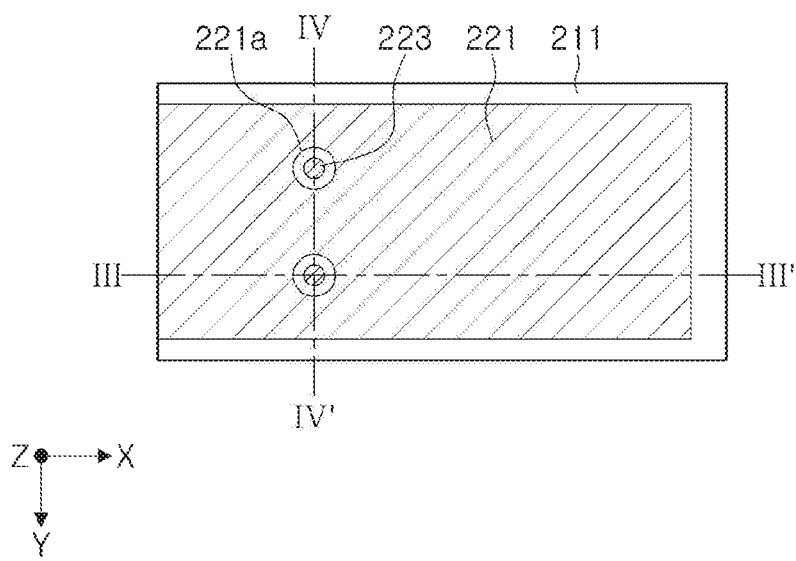
FIG. 9 is a plan view of a first internal electrode according another exemplary embodiment of the present disclosure.

FIG. 9 is a plan view of a first internal electrode according another exemplary embodiment of the present disclosure.

Figure 10:
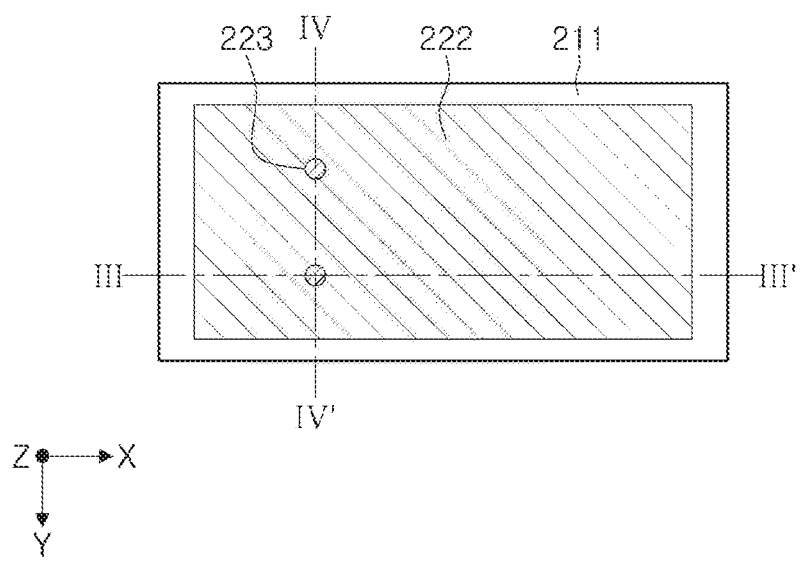
FIG. 10 is a plan view of a second internal electrode according another exemplary embodiment of the present disclosure.

FIG. 10 is a plan view of a second internal electrode according another exemplary embodiment of the present disclosure.

Hereinafter, a multilayer electronic component 200 according to another exemplary embodiment will be described in detail with reference to FIGS. 6 to 10. The same descriptions of the multilayer electronic component 200 as those of the multilayer electronic component 100 according to an exemplary embodiment will be omitted to avoid duplicate descriptions.

According to another exemplary embodiment, one end portion of a resistor 241 in a second direction may be connected to a second band portion B2 of a second external electrode 232, and the other end portion of the resistor 241 in the second direction may be spaced apart from an end of a first band portion B1 of a first external electrode 231. As the other end portion of the resistor 241 in the second direction is spaced apart from the end of the first band portion B1 of the first external electrode 231, electrical connection to the second external electrode 232 may be prevented even when a cover portion 251 is not present. According to another exemplary embodiment, since the resistor 241 is disposed on a second surface 2 of a body 220, a width of the resistor 241 (a length of the resistor 241 in a second direction) may be controlled to control a resistance value.

The first external electrode 231 may include electrode layers 231a and 232a disposed on the body 210, and plating layers 231b and 232b disposed on the electrode layers 231a and 232a.

By controlling a location of a via electrode 223 and a location of an opening 221a included in the first internal electrode 221, an overlapping area between the first and second internal electrodes 221 and 222, alternately disposed with respective dielectric layers 211 interposed therebetween, may be maintained to be the same as an overlapping area between the first and second internal electrode 121 and 122 of the multilayer electronic component 100 according to an exemplary embodiment.

As described above, a multilayer electronic component includes a resistor. Accordingly, when a short-circuit occurs between internal electrodes, the resistor may be opened by overcurrent generated by the short-circuit to prevent damage to the entire circuit connected to the multilayer electronic component.

In addition, the resistor is disposed on a surface of a body, and the resistor and an internal electrode are connected to each other through a via electrode. Thus, a resistance value of the resistor may be easily adjusted.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers, and first and second internal electrodes alternately stacked with respective dielectric layers interposed therebetween in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction;
a resistor disposed on the second surface;
a via electrode exposed to the second surface and connecting the second internal electrode and the resistor to each other;
a first external electrode disposed on the third surface and connected to the first internal electrode; and
a second external electrode disposed on the fourth surface and connected to the resistor.

2. The multilayer electronic component of claim 1, wherein the first internal electrode is spaced apart from the fourth surface and is exposed to the third surface, and
the second internal electrode is spaced apart from the third and fourth surfaces.

3. The multilayer electronic component of claim 1, wherein the first internal electrode has an opening by which the first internal electrode is spaced apart from the via electrode, and
the via electrode is disposed to penetrate through the second internal electrode and the opening.

4. The multilayer electronic component of claim 1, wherein the via electrode includes two or more via electrodes.

5. The multilayer electronic component of claim 4, wherein the two or more via electrodes are disposed side by side in the third direction.

6. The multilayer electronic component of claim 1, wherein the resistor is a fuse.

7. The multilayer electronic component of claim 1, wherein a first end portion of the resistor in the second direction is connected to the second external electrode, and
a second end portion of the resistor in the second direction is connected to the via electrode.

8. The multilayer electronic component of claim 1, further comprising:
a cover portion disposed on the resistor,
wherein the cover portion covers a portion of the resistor except for the first end portion of the resistor in the second direction connected to the second external electrode.

9. The multilayer electronic component of claim 8, wherein the second external electrode extends to cover the first end portion of the resistor, and
the first external electrode extends to cover a portion of the cover portion.

10. The multilayer electronic component of claim 1, wherein the resistor is a metal glaze.

11. The multilayer electronic component of claim 1, wherein the first external electrode includes a first connection portion disposed on the third surface, and a first band portion extending from the first connection portion along a portion of the first and second surfaces, and
the second external electrode includes a second connection portion disposed on the fourth surface, and a second band portion extending from the second connection portion along a portion of the first and second surfaces.

12. The multilayer electronic component of claim 11, wherein a first end portion of the resistor in the second direction is connected to the second band portion, and
a second end portion of the resistor in the second direction is spaced apart from an end of the first band portion.

13. The multilayer electronic component of claim 1, wherein a first end portion of the resistor in the second direction is connected to the second external electrode, and
a second end portion of the resistor in the second direction is spaced apart from an end of the first external electrode.

14. The multilayer electronic component of claim 1, wherein the first external electrode comprises a first electrode layer disposed on the third surface and a first plating layer disposed to cover the first electrode layer, and
the second external electrode comprises a second electrode layer disposed on the fourth surface and a second plating layer disposed to cover the second electrode layer.

* * * * *